United States Patent
Shi et al.

(10) Patent No.: US 11,604,275 B2
(45) Date of Patent: Mar. 14, 2023

(54) LASER POSITIONING APPARATUS AND LASER POSITIONING METHOD

(71) Applicant: NORTHWEST INSTRUMENT INC., Dover, NJ (US)

(72) Inventors: Xin Shi, Shanghai (CN); Jinmin Zeng, Shanghai (CN); David Xing, Dover, NJ (US)

(73) Assignee: NORTHWEST INSTRUMENT INC., Dover, NJ (US)

( * ) Notice: Subject to any disclaimer, the term of this patent is extended or adjusted under 35 U.S.C. 154(b) by 583 days.

(21) Appl. No.: 16/314,898

(22) PCT Filed: Jul. 12, 2017

(86) PCT No.: PCT/CN2017/092600
§ 371 (c)(1),
(2) Date: Jan. 3, 2019

(87) PCT Pub. No.: WO2018/153007
PCT Pub. Date: Aug. 30, 2018

(65) Prior Publication Data
US 2019/0369245 A1   Dec. 5, 2019

(30) Foreign Application Priority Data

Feb. 24, 2017   (CN) .......................... 201710102197.3

(51) Int. Cl.
*G01S 17/08*   (2006.01)
*G01S 7/481*   (2006.01)
*G01S 7/497*   (2006.01)

(52) U.S. Cl.
CPC .............. *G01S 17/08* (2013.01); *G01S 7/481* (2013.01); *G01S 7/497* (2013.01)

(58) Field of Classification Search
CPC .......... G01S 17/06; G01S 17/08; G01S 17/42; G01S 7/481; G01S 7/4814; G01S 7/497
See application file for complete search history.

(56) References Cited

U.S. PATENT DOCUMENTS

2004/0051860 A1* 3/2004 Honda ................. G01S 7/4808
356/4.01
2014/0016114 A1* 1/2014 Lopez .................... G01S 17/46
356/138

(Continued)

FOREIGN PATENT DOCUMENTS

CN   202794521 U   3/2013
CN   103075963 A   5/2013

(Continued)

OTHER PUBLICATIONS

International Search Report and Written Opinion for Application No. PCT/CN2017/092600, dated Nov. 23, 2017.

*Primary Examiner* — Yuqing Xiao
*Assistant Examiner* — Benjamin Richard Hebert
(74) *Attorney, Agent, or Firm* — Anova Law Group, PLLC

(57) ABSTRACT

The present invention relates to a laser positioning apparatus and a laser positioning method, the laser positioning apparatus comprises a laser emitting module configured to generate a first laser; a laser direction adjusting module configured to adjust the first laser to a second laser in a first direction when the laser direction adjusting module is located in a first position, and adjust the first laser to a third laser in a second direction perpendicular to the first direction when the laser direction adjusting module is located in a second position; a distance determining module configured to receive the laser reflected or diffused back by the second laser on a surface of a first object to be measured to determine a distance from the laser positioning apparatus to (Continued)

the first object to be measured, or receive the laser reflected or diffused back by the third laser on a surface of a second object to be measured to determine a distance from the laser positioning apparatus to the second object to be measured.

13 Claims, 3 Drawing Sheets

(56) References Cited

U.S. PATENT DOCUMENTS

| | | | | |
|---|---|---|---|---|
| 2014/0071433 A1* | 3/2014 | Eisele | .................... | G01S 7/4914 |
| | | | | 356/5.01 |
| 2015/0309174 A1* | 10/2015 | Giger | ...................... | G01S 17/86 |
| | | | | 382/106 |
| 2016/0170024 A1* | 6/2016 | Bockem | .................. | G01S 17/87 |
| | | | | 356/5.09 |
| 2016/0274035 A1* | 9/2016 | Hasegawa | .......... | G01N 21/8851 |
| 2016/0274239 A1* | 9/2016 | Gupta | ...................... | G01C 3/08 |
| 2018/0106901 A1* | 4/2018 | Frederiksen | .......... | G01S 7/4816 |

FOREIGN PATENT DOCUMENTS

| | | | |
|---|---|---|---|
| CN | 204789996 U | 11/2015 | |
| CN | 105629256 A | 6/2016 | |
| CN | 106019297 A | 10/2016 | |
| CN | 106291510 A | 1/2017 | |
| CN | 106886027 A | 6/2017 | |
| EP | 2454608 B1 * | 3/2013 | ........... G01C 15/002 |

\* cited by examiner

LASER POSITIONING APPARATUS AND LASER POSITIONING METHOD

FIELD OF THE DISCLOSURE

The present invention relates to the field of distance measurement, and more particularly to a laser positioning apparatus and a laser positioning method.

BACKGROUND

Although a variety of laser positioning apparatus are known in the prior art, the known laser positioning apparatus can either only reuse the same laser positioning apparatus at different times to measure distances in different directions or only use two independent laser positioning apparatus to measure distances in two respective different directions as performing distance measurement in different directions.

For example, Chinese Patent No. CN103075963B provides an indoor positioning system including a controller, a driving means and a rotating mechanism which are sequentially connected, and a first laser rangefinder and a second laser rangefinder respectively connected to the controller; the first laser rangefinder and the second laser rangefinder are fixedly mounted to the rotating mechanism, and the light emitted by the first laser rangefinder is perpendicular to the light emitted by the second laser rangefinder. The invention also provides an indoor positioning method. With employing the technical solution of the invention, two perpendicular laser rangefinders can be used for positioning, which makes the positioning precision high, and the distance relationship between the two laser rangefinders and the reference edge can be used to calibrate the directions of the lights emitted by the laser rangefinders, which may implement the calibration of the positioning system using a simple structure and have the novel concept.

However, from reading through this patent, it is not difficult to find that in this indoor positioning system, measuring distances in different directions is implemented by employing independent laser positioning apparatus.

SUMMARY

In view of the above technical problem, there is a technical problem in the prior art that distances in two directions cannot be measured by a single laser positioning apparatus without rotating the laser positioning apparatus, and a laser positioning apparatus is provided according to the present invention, the laser positioning apparatus comprises:

a laser emitting module configured to generate a first laser;

a laser direction adjusting module configured to adjust the first laser to a second laser in a first direction when the laser direction adjusting module is located in a first position, and adjust the first laser to a third laser in a second direction perpendicular to the first direction when the laser direction adjusting module is located in a second position;

a distance determining module configured to receive the laser reflected or diffused back by the second laser on a surface of a first object to be measured to determine a distance from the laser positioning apparatus to the first object to be measured, or receive the laser reflected or diffused back by the third laser on a surface of a second object to be measured to determine a distance from the laser positioning apparatus to the second object to be measured.

By means of the laser positioning apparatus according to the present invention, the distances in two directions can be measured using only one laser emitting module, thereby simplifying the structure of the laser positioning apparatus and reducing the manufacturing cost.

In one embodiment according to the present invention, the laser direction adjusting module is configured as a mirror. In such an implementation, the laser direction adjusting module according to the present invention may be implemented conveniently and inexpensively, and then the first laser is adjusted to the second laser in the first direction and the third laser in the second direction perpendicular to the first direction.

In one embodiment according to the present invention, the distance determining module comprises:

a first receiving objective lens configured to receive and process the laser reflected or diffused back by the second laser on the surface of the first object to be measured; and a first receiver configured to receive the laser processed by the first receiving objective lens.

In such an implementation, the laser positioning apparatus is capable of receiving the laser reflected or diffused back from a front object in a first direction and performing optical processing such as focusing on it, and then the laser receiver is capable of receiving the light such as the focused light, then sequentially determining a distance from the front object to the laser positioning apparatus in the first direction to implement the positioning function based on the distance.

In one embodiment according to the present invention, the distance determining module further comprises:

a second receiving objective lens configured to receive and process the laser reflected or diffused back by the third laser on the surface of the second object to be measured; and a second receiver configured to receive the laser processed by the second receiving objective lens.

In such an implementation, the laser positioning apparatus is capable of receiving the laser reflected or diffused back from the front object in the first and/or second directions and performing optical processing such as focusing on it, and then the laser receiver is capable of receiving the light such as the focused light, then sequentially determining the distance from the front object to the laser positioning apparatus in the first and/or second directions to implement the positioning function based on the distance.

In one embodiment according to the present invention, the laser positioning apparatus further comprises:

a display module configured to display a distance from the laser positioning apparatus to the first object to be measured and/or a distance from the laser positioning apparatus to the second object to be measured.

When the laser positioning apparatus according to the present invention has the above-mentioned display module, the laser positioning apparatus may display the measured distance more visually, be convenient to use, and simultaneously display the distance from the laser positioning apparatus to the first object to be measured and/or a distance from the laser positioning apparatus to the second object to be measured.

In one embodiment according to the present invention, the display module further comprises a prompting module configured to issue a prompt when the distance from the laser positioning apparatus to the first object to be measured satisfies a predetermined requirement, and/or the distance from the laser positioning apparatus to the second object to be measured satisfies the predetermined requirement.

In such an implementation, the laser positioning apparatus according to the present invention is capable of prompting the user of the distance from the target object and whether a predetermined positioning point has been reached.

In one embodiment of the present invention, the laser positioning apparatus further comprises a direction indicating module configured to determine a position relationship between the second laser and the first object to be measured, and/or determining a position relationship between the third laser and the second object to be measured.

In one embodiment in accordance with the present invention, the laser positioning apparatus further comprises a direction adjusting module configured to adjust the laser positioning apparatus according to the position relationship determined by the direction indicating module such that the second laser is perpendicular to the surface of the first object to be measured and/or the third laser is perpendicular to the surface of the second object to be measured.

At this time, the laser positioning apparatus according to the present invention is capable of adjusting its own posture so that the distance may be measured relatively perpendicularly to the reference object, thereby enabling more accurate positioning.

In one embodiment according to the present invention, the laser positioning apparatus further comprises a control module configured to control the laser positioning apparatus based on the position relationship between the second laser and the first object to be measured and/or the position relationship between the third laser and the second object to be measured.

In one embodiment according to the present invention, the laser positioning apparatus further comprises a communicating module configured to receive positioning information and/or output the measured position information. In such an implementation, the laser positioning apparatus according to the present invention can be more intelligently connected to an external device, thereby implementing an intelligent positioning function.

Further, a second aspect of the present invention provides a laser positioning method, wherein the laser positioning method comprises:

adjusting a first laser to a second laser in a first direction when the laser direction adjusting module is located in a first position, or adjusting the first laser to a third laser in a second direction perpendicular to the first direction when the laser direction adjusting module is located in a second position;

positioning the laser positioning apparatus with the second laser and the third laser.

By means of the laser positioning method according to the present invention, the distances in two directions can be measured using only one laser emitting module, thereby simplifying the structure of the laser positioning apparatus and reducing the manufacturing cost.

In one embodiment according to the present invention, the laser positioning method further comprises:

receiving position information to be positioned; and positioning a laser positioning apparatus with the second laser and the third laser according to the position information.

In one embodiment according to the present invention, the laser positioning method further comprises:

receiving the laser reflected or diffused back by the second laser on a surface of a first object to be measured to determine a distance from the laser positioning apparatus to the first object to be measured; and receiving the laser reflected or diffused back by the third laser on a surface of a second object to be measured to determine a distance from the laser positioning apparatus to the second object to be measured.

By means of the laser positioning apparatus and the laser positioning method according to the present invention, the distances in both directions can be measured using only one laser emitting module, thereby simplifying the structure of the laser positioning apparatus and reducing the manufacturing cost.

BRIEF DESCRIPTION OF THE DRAWINGS

Embodiments are illustrated and described with reference to the figures. These figures are used to clarify the basic principles and thus only illustrate the aspects necessary to understand the basic principles. These figures are not to scale. In the figures, the same reference numbers indicate similar features.

Other features, aspects, advantages and benefits of the present invention will become more apparent in conjunction with the detailed description of the appended claims.

DETAILED DESCRIPTION

In the following detailed description of the preferred embodiments, reference will be made to the accompanying figures which are parts of the present invention. The accompanying figures illustrate, by way of example, specific embodiments that can implement the present invention. The exemplary embodiments are not intended to be exhaustive of all embodiments according to the present invention. It may be appreciated that other embodiments may be utilized and structural or logical modifications may be made without departing from the scope of the present invention. Therefore, the following detailed description is not to be limited but to be defined by the appended claims.

Figure 1:
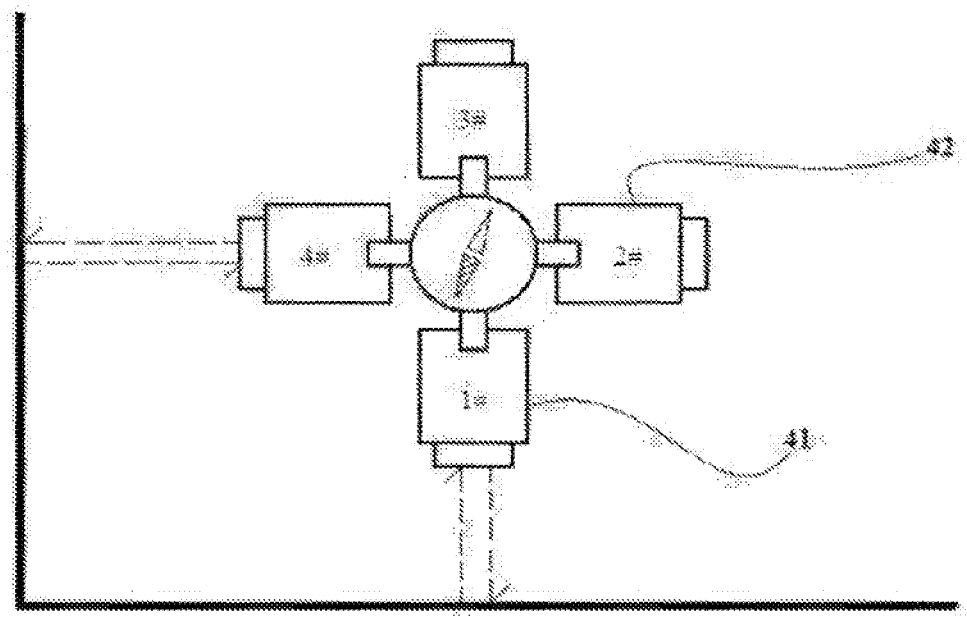
FIG. 1 illustrates a schematic view of a laser positioning apparatus in the prior art.

FIG. 1 illustrates a schematic view of a laser positioning apparatus in the prior art. As can be seen from the figure, the indoor positioning system includes a controller 1 #, a driving means 2 #, and a rotating mechanism 3 #which are sequentially connected, a first laser rangefinder 41 and a second laser rangefinder 42 respectively connected to the controller 1; the first laser rangefinder 41 and the second laser rangefinder 42 are fixedly mounted to the rotating mechanism 3, and the light emitted by the first laser rangefinder 41 is perpendicular to the light emitted by the second laser rangefinder 42. That is, the indoor positioning system according to the prior art employs independent first laser rangefinder 41 and second laser rangefinder 42 to measure the distances in two directions respectively.

Figure 2:
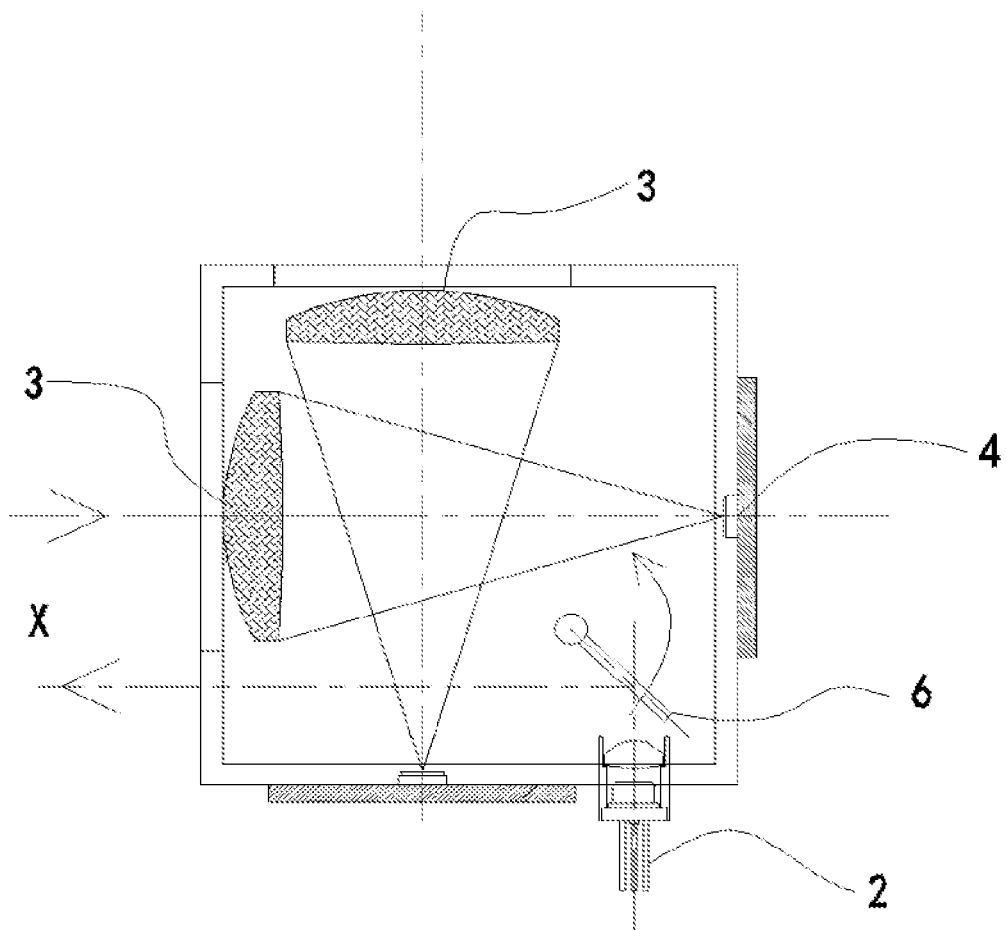
FIGS. 2 and 3 are schematic views illustrating the laser direction adjusting module of the laser positioning apparatus according to the present invention in a first position and a second position.
Figure 3:
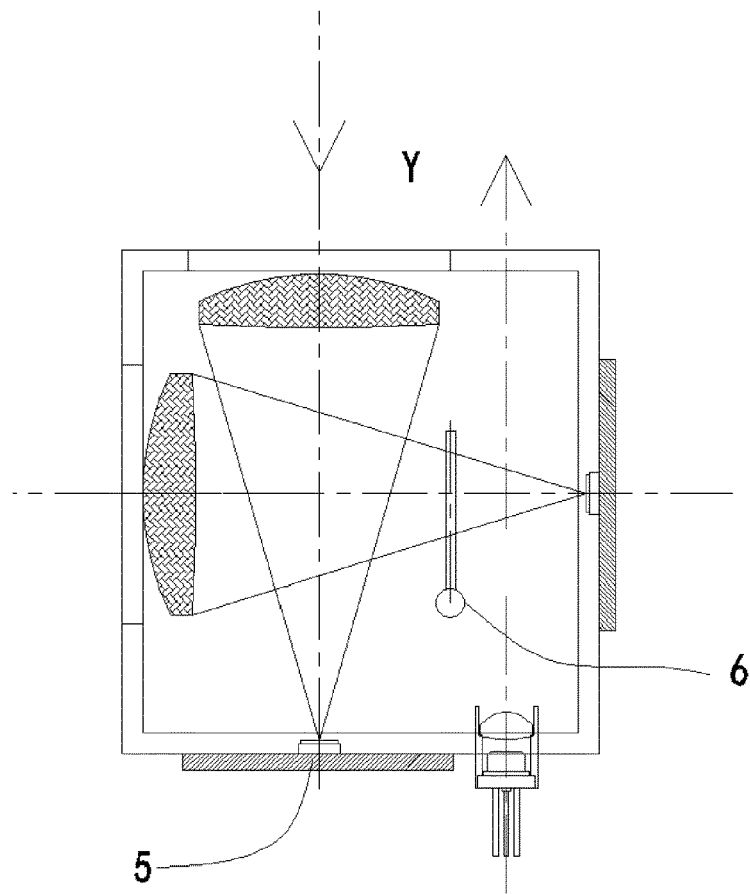

In contrast, the laser positioning apparatus according to the present invention can implement the measurement of the distances in two directions with a same laser rangefinder, i.e., the laser positioning module mentioned in the present invention may implement the measurement of the distances in two directions, and further implement the positioning functions in two dimensions. FIGS. 2 and 3 are schematic views illustrating the laser direction adjusting module of the laser positioning apparatus in first and second positions according to the present invention, as can be seen from the figures, the laser positioning apparatus 1 according to the present invention includes: a laser emitting module 2 configured to generate a first laser;

a laser direction adjusting module 6 configured to adjust the first laser to a second laser in a direction X when the laser direction adjusting module 6 is in a first position (as shown in FIG. 2), and adjust the first laser to a third laser in a direction Y perpendicular to the direction X when the laser direction adjusting module 6 is in a second position (as shown in FIG. 3);

the distance determining modules (including 3 and 4) are configured to receive the laser reflected or diffused back by the second laser on a surface of a first object to be measured to determine a distance from the laser positioning apparatus to the first object to be measured; and the distance determining modules (including 3 and 5) are configured to receive the laser reflected or diffused back by the third laser on a surface of a second object to be measured to determine a distance from the laser positioning apparatus to the second object to be measured.

By means of the laser positioning apparatus according to the present invention, the distances in two directions X and Y can be measured using only one laser emitting module 2, thereby simplifying the structure of the laser positioning apparatus 1 and reducing the manufacturing cost.

It should be appreciated by those skilled in the art that disposing the laser direction adjusting module 6 in the first and second positions can be implemented by a variety of ways, such as by manual dialing or by employing an electric way of a drive motor. In an implementation of employing the drive motor, the drive motor is used to drive and control the laser direction adjusting module 6 to switch between the first position and the second position. For example, in FIG. 2, the mirror is fixedly connected to a drive shaft of the drive motor, such as a stepper motor that is capable of accurately driving the laser direction adjusting module 6 to the first position or the second position.

In one embodiment according to the present invention, the laser direction adjusting module 6 is configured as a mirror. In such an implementation, the laser direction adjusting module provided according to the present invention may be implemented conveniently and inexpensively, and then the first laser may be adjusted to the second laser in the first direction or the third laser in the second direction perpendicular to the first direction.

In one embodiment according to the present invention, the distance determining module comprises:

a first receiving objective lens 3 configured to receive and process the laser reflected or diffused back by the second laser on the surface of the first object to be measured; and a first receiver 4 configured to receive the laser processed by the first receiving objective lens.

In such an implementation, the laser positioning apparatus 1 is capable of receiving the laser reflected or diffused back from a front object in the first direction and performing optical processing such as focusing on it, and then the laser receiver is capable of receiving the light such as the focused light, and then sequentially determining a distance from the front object to the laser positioning apparatus in the first direction to implement the positioning function based on the distance.

It should be appreciated by those skilled in the art that the first receiving objective lens 3 here may also enable the same receiving objective lens 3 to receive the second laser and the third laser simultaneously by the way of, for example, adding optical elements such as a group of mirrors.

Of course, receiving and processing the third laser may also be implemented by the way of providing an additional second receiving objective lens, for example, in one embodiment according to the present invention, the distance determining module further comprises:

a second receiving objective lens 3 configured to receive and process the laser reflected or diffused back by the third laser on the surface of the second object to be measured; and a second receiver 5 configured to receive the laser processed by the second receiving objective lens.

In such an implementation, the laser positioning apparatus is capable of receiving the laser reflected or diffused back from the front object in the first and/or second directions and performing optical processing such as focusing on it, and then the laser receiver is capable of receiving the light such as the focused light, and then sequentially determining the distance from the front object to the laser positioning apparatus in the first and/or second directions to implement the positioning function based on the distance.

In one embodiment of the present invention, the laser positioning apparatus 1 further comprises:

a display module (not shown) configured to display a distance from the laser positioning apparatus to the first object to be measured and/or a distance from the laser positioning apparatus to the second object to be measured.

When the laser positioning apparatus according to the present invention has the above-mentioned display module, the laser positioning apparatus may display the measured distance more visually, be convenient to use, and simultaneously display the distance from the laser positioning apparatus to the first object to be measured and/or the distance from the laser positioning apparatus to the second object to be measured.

In one embodiment according to the present invention, the display module further comprises a prompting module configured to issue a prompt when the distance from the laser positioning apparatus to the first object to be measured satisfies a predetermined requirement and/or when the distance from the laser positioning apparatus to the second object to be measured satisfies the predetermined requirement.

In such an implementation, the laser positioning apparatus according to the present invention is capable of prompting the user of the distance from the target object and whether a predetermined positioning point has been reached.

In one embodiment of the present invention, the laser positioning apparatus 1 further comprises a direction indicating module configured to determine a position relationship between the second laser and the first object to be measured and/or determining a position relationship between the third laser and the second object to be measured.

In one embodiment according to the present invention, the laser positioning apparatus 1 further comprises a direction adjusting module configured to adjust the laser positioning apparatus according to a position relationship determined by the direction indicating module, such that the second laser is perpendicular to a surface of the first object to be measured and/or the third laser is perpendicular to a surface of the second object to be measured.

At this time, the laser positioning apparatus according to the present invention is capable of adjusting its own posture so that the distance may be measured relatively perpendicularly to the reference object, thereby enabling more accurate positioning.

In one embodiment according to the present invention, the laser positioning apparatus further comprises a control module configured to control the laser positioning apparatus based on the position relationship between the second laser and the first object to be measured and/or the position relationship between the third laser and the second object to be measured.

In one embodiment according to the present invention, the laser positioning apparatus further comprises a communicating module configured to receive positioning information and/or output the measured position information. In such an implementation, the laser positioning apparatus according to the present invention may be more intelligently connected to an external device, thereby implementing an intelligent positioning function.

Figure 4:
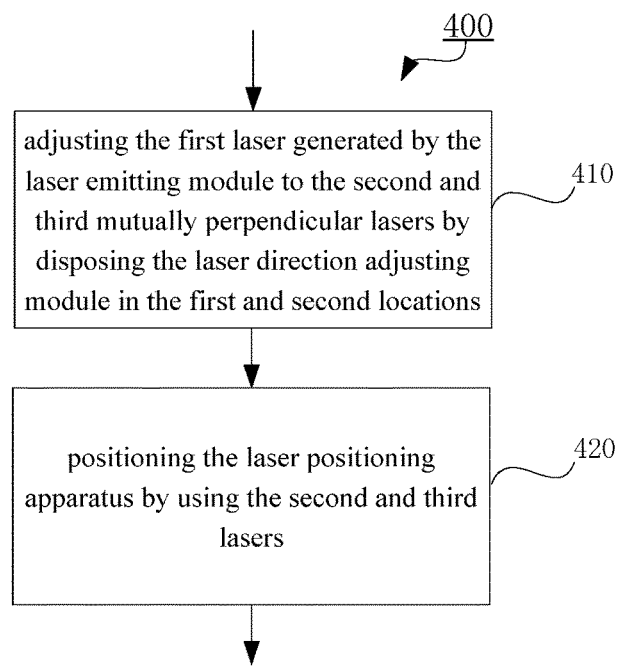
FIG. 4 illustrates a flowchart 400 of a laser positioning method according to the present invention.

Further, a second aspect of the present invention provides a laser positioning method, and FIG. 4 illustrates a flowchart 400 of a laser positioning method according to the present invention. As can be seen from the figure, the laser positioning method comprises the following steps:

First, in a first step 410, when the laser direction adjusting module is located in a first position, adjusting a first laser to a second laser in a first direction, or when the laser direction adjusting module is located in a second position, adjusting the first laser to a third laser in a second direction perpendicular to the first direction; and Then, in a second step 420, positioning the laser positioning apparatus with the second and third lasers.

By means of the laser positioning method according to the present invention, the distances in two directions can be measured using only one laser emitting module 2, thereby simplifying the structure of the laser positioning apparatus 1 and reducing the manufacturing cost.

In one embodiment of the present invention, the laser positioning method further comprises:

receiving position information to be positioned; and positioning the laser positioning apparatus with the second laser and the third laser according to the position information.

In one embodiment of the present invention, the laser positioning method further comprises:

receiving the laser reflected or diffused back by the second laser on a surface of a first object to be measured to determine a distance from the laser positioning apparatus to a first object to be measured; and receiving the laser reflected or diffused back by the third laser on a surface of a second object to be measured to determine a distance from the laser positioning apparatus to the second object to be measured.

Figure 5:
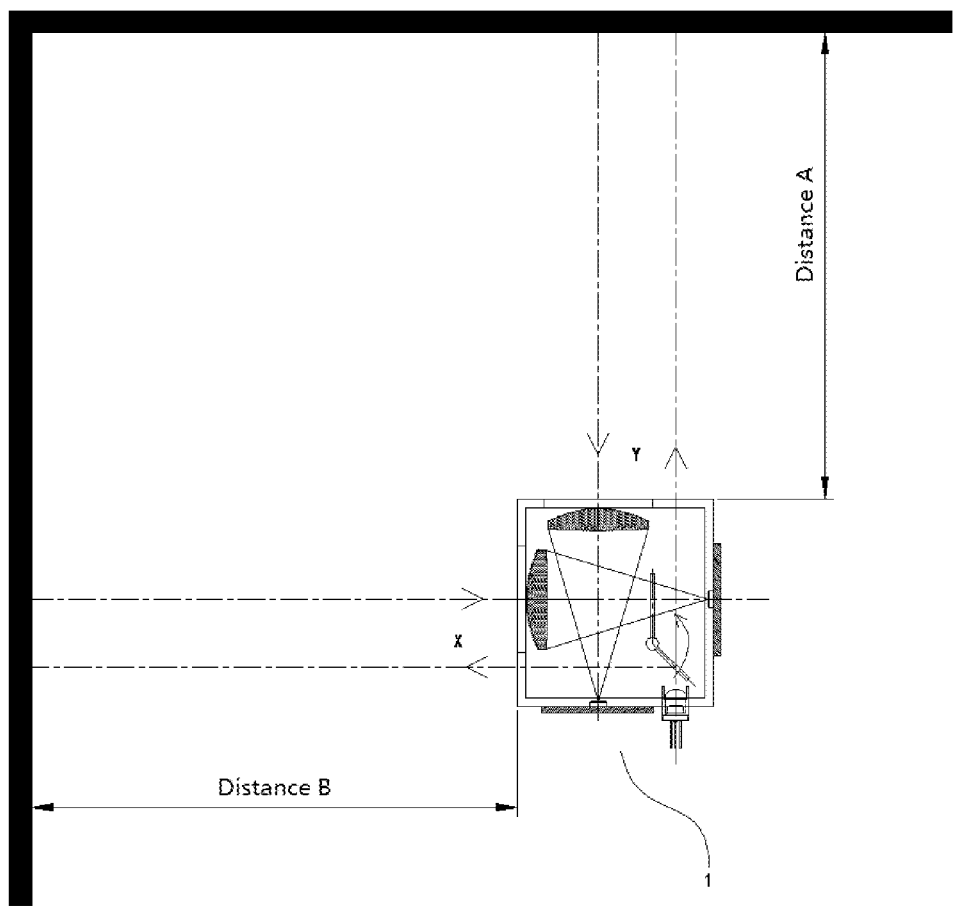
FIG. 5 illustrates a schematic view 500 of a laser positioning apparatus in use according to the present invention.

FIG. 5 illustrates a schematic view 500 of a laser positioning apparatus in use according to the present invention. As can be seen from the figure, the laser emitted by the laser emitting module 2 passes through the laser direction adjusting module 6, and the first laser is adjusted to a second laser in the first direction X when the laser direction adjusting module 6 is in the first position, and the first laser is adjusted to a third laser in the second direction Y perpendicular to first direction X when the laser direction adjusting module 6 is in the second position, thereafter, the two laser beams are respectively irradiated to the target object, for example, reflected back on the wall surface, and the laser positioning apparatus can measure the distance A and the distance B by analyzing the reflected light, thereby being used for positioning. As previously mentioned, the laser positioning apparatus can, for example, comprise a communication module by which a target point to be positioned can be received from other devices, and then the laser positioning apparatus compares the current positioning point with the target point for giving an operation instruction for operator to position easily.

The laser positioning apparatus referred to in the present disclosure is capable of measuring the distance in the first direction as well as measuring the distance in the second direction perpendicular to the first direction without rotating the laser positioning apparatus. After obtaining the distance between the two mutually perpendicular directions, the current location of the laser positioning apparatus can be positioned, e.g., to give a two-dimensional coordinate of the current position of the laser positioning apparatus.

By means of the laser positioning apparatus and the laser positioning method according to the present invention, the distances in both directions can be measured using only one laser emitting module, thereby simplifying the structure of the laser positioning apparatus and reducing the manufacturing cost.

It should be appreciated by those skilled in the art that various changes and modifications may be made without departing from the spirit of the present invention. Therefore, the scope of the present invention should be defined by the appended claims.

While various exemplary embodiments of the present invention have been described, it will be apparent to those skilled in the art that various changes and modifications can be made which can implement some of the advantages of the present invention without departing from the spirit and scope of the present invention. Other components performing the same functions may be appropriately replaced for those skilled in the art. It should be mentioned that features explained herein with reference to particular figures may be combined with features of other figures, even in those cases where this is not explicitly mentioned. Moreover, the method of the present invention can be implemented in either a software implementation using appropriate processor instructions or in a hybrid implementation that utilizes a combination of hardware logic and software logic to achieve the same results. Such modifications to the solution of the present invention are intended to be covered by the appended claims.

What is claimed is:

1. A laser positioning apparatus, comprising:
   a laser emitting module configured to generate a first laser; and
   a laser direction adjusting module connected to and driven by a drive motor to switch between a first position and a second position, wherein, at the first position, the laser direction adjusting module is configured to adjust the first laser to form a second laser in a first direction, and at the second position, the laser direction adjusting module is configured to adjust the first laser to form a third laser in a second direction perpendicular to the first direction, wherein the laser direction adjusting module pivots about a pivot end while switching from the first position to the second position, and the pivot end is separate from the laser emitting module, and wherein the laser direction adjusting module travels an angular distance greater than 90 degrees while switching from the first position to the second position.

2. The laser positioning apparatus according to claim 1, wherein the laser direction adjusting module includes a mirror.

3. The laser positioning apparatus according to claim 1, further comprising:
   a display module configured to display a distance from the laser positioning apparatus to an object to be measured.

4. The laser positioning apparatus according to claim 3, further comprising:
a prompting module configured to issue a prompt when the distance from the laser positioning apparatus to the object to be measured satisfies a predetermined requirement.

5. The laser positioning apparatus according to claim 1, further comprising:
a direction indicating module configured to determine a first position relationship between the second laser and a first object to be measured, and/or determine a second position relationship between the third laser and a second object to be measured.

6. The laser positioning apparatus according to claim 5, further comprising:
a direction adjusting module configured to adjust the laser positioning apparatus according to the first or the second position relationship.

7. The laser positioning apparatus according to claim 5, further comprising:
a control module configured to control the laser positioning apparatus according to the first or the second position relationship.

8. The laser positioning apparatus according to claim 1, wherein the laser direction adjusting module includes a distal end opposing the pivot end with an arm in between, and while the laser direction adjusting module is at the first position, the distal end is closer to the laser emitting module than the pivot end along the second direction.

9. The laser positioning apparatus according to claim 1, wherein the laser direction adjusting module includes a distal end opposing the pivot end with an arm in between, and while the laser direction adjusting module is at the second position, the pivot end is closer to the laser emitting module than the distal end along the second direction.

10. The laser positioning apparatus according to claim 1, further comprising:
a housing to receive a portion of the laser emitting module, wherein the laser direction adjusting module is enclosed within the housing.

11. The laser positioning apparatus according to claim 1, further comprising:
a first receiving objective lens configured to process a laser returned from a first object upon receipt of the second laser by the first object, and a first receiver configured to receive the laser processed by the first receiving objective lens; and
a second receiving objective lens configured to process a laser returned from a second object upon receipt of the third laser by the second object, and a second receiver configured to receive the laser processed by the second receiving objective lens,
wherein the first receiver is positioned closer to the laser direction adjusting module than the first receiving objective lens along the first direction, and
wherein the second receiver is positioned closer to the laser direction adjusting module than the second receiving objective lens along the second direction.

12. A laser positioning method, performed by a laser positioning apparatus including a laser emitting module and a laser direction adjusting module, the laser direction adjusting module connected to and driven by a drive motor to switch between a first position and a second position, the method comprising:
generating, by the laser emitting module, a first laser; and
adjusting, by the laser direction adjusting module at the first position, a first laser to a second laser in a first direction, and adjusting, by the laser direction adjusting module at the second position, the first laser to a third laser in a second direction perpendicular to the first direction, wherein the laser direction adjusting module pivots about a pivot end while switching from the first position to the second position, and the pivot end is separate from the laser emitting module, and wherein the laser direction adjusting module travels an angular distance greater than 90 degrees while switching from the first position to the second position.

13. The laser positioning method according to claim 12, further comprising:
receiving position information to be positioned; and
positioning the laser positioning apparatus with the second laser or the third laser according to the position information.

* * * * *